(12) United States Patent
Ehmanns et al.

(10) Patent No.: US 7,520,358 B2
(45) Date of Patent: Apr. 21, 2009

(54) DEVICE FOR GENERATING A HAPTIC SIGNAL IN A VEHICLE

(75) Inventors: Dirk Ehmanns, Unterfoehring (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 71 days.

(21) Appl. No.: 11/650,995

(22) Filed: Jan. 9, 2007

(65) Prior Publication Data

US 2007/0131471 A1 Jun. 14, 2007

Related U.S. Application Data

(63) Continuation of application No. PCT/EP2005/007142, filed on Jul. 1, 2005.

(30) Foreign Application Priority Data

Jul. 10, 2004 (DE) ........................ 10 2004 033 487

(51) Int. Cl.
B60K 31/02 (2006.01)

(52) U.S. Cl. ...................... 180/178; 180/170; 180/219; 180/220

(58) Field of Classification Search ................ 180/170, 180/178, 219, 220
See application file for complete search history.

(56) References Cited

U.S. PATENT DOCUMENTS

| 4,645,027 | A | * | 2/1987 | Masuda | 180/176 |
|---|---|---|---|---|---|
| 4,706,195 | A | * | 11/1987 | Yoshino et al. | 701/96 |
| 4,796,716 | A | * | 1/1989 | Masuda | 180/176 |
| 4,838,780 | A | * | 6/1989 | Yamagata et al. | 123/352 |
| 4,966,247 | A | * | 10/1990 | Masuda | 180/171 |
| 4,972,918 | A | * | 11/1990 | Kikuta et al. | 180/177 |
| 5,217,087 | A | * | 6/1993 | Ikegami et al. | 180/219 |
| 5,365,444 | A | * | 11/1994 | Suzuki et al. | 701/74 |
| 6,135,227 | A | * | 10/2000 | Laning | 180/170 |
| 6,820,710 | B2 | * | 11/2004 | Fechner | 180/170 |
| 6,941,215 | B2 | * | 9/2005 | Hellmann et al. | 701/93 |

(Continued)

FOREIGN PATENT DOCUMENTS

DE 42 16 764 A1 11/1993

(Continued)

OTHER PUBLICATIONS

International Search Report dated Sep. 14, 2005 including English translation (Four (4) pages).

(Continued)

*Primary Examiner*—Christopher P Ellis
*Assistant Examiner*—Jacob Meyer
(74) *Attorney, Agent, or Firm*—Crowell & Moring LLP

(57) ABSTRACT

A device for generating a haptic signal in a vehicle is provided, in which a driver's command can be given via a rotary gas handle. A servo unit is formed in such a manner that, as a function of at least one detected operational condition for driving, a theoretical speed of the vehicle can be generated. Based on the theoretical speed of the vehicle, a servo signal for actuation of a servo element of the vehicle is generated, where the servo element is formed such that a restoring force for the rotary gas handle or the torque required for moving the rotary gas handle is adjusted thereby.

12 Claims, 1 Drawing Sheet

U.S. PATENT DOCUMENTS

| | | | |
|---|---|---|---|
| 6,968,266 B2 * | 11/2005 | Ahmed-Zaid et al. | 701/96 |
| 7,445,071 B2 * | 11/2008 | Yamazaki et al. | 180/219 |
| 2001/0052893 A1 | 12/2001 | Jolly et al. | |
| 2002/0027031 A1 * | 3/2002 | Miyata | 180/219 |
| 2003/0204298 A1 * | 10/2003 | Ahmed-Zaid et al. | 701/96 |
| 2004/0073367 A1 * | 4/2004 | Altan et al. | 701/301 |
| 2005/0012602 A1 * | 1/2005 | Knoop et al. | 340/435 |
| 2005/0131590 A1 * | 6/2005 | Kuge et al. | 701/1 |
| 2005/0187684 A1 * | 8/2005 | Hijikata et al. | 701/45 |
| 2005/0222742 A1 * | 10/2005 | Yamamura | 701/70 |
| 2005/0251301 A1 * | 11/2005 | Suzuki | 701/23 |
| 2005/0273263 A1 * | 12/2005 | Egami et al. | 701/301 |
| 2005/0288844 A1 * | 12/2005 | Kimura et al. | 701/100 |
| 2006/0219455 A1 * | 10/2006 | Watanabe et al. | 180/219 |

FOREIGN PATENT DOCUMENTS

| | | |
|---|---|---|
| DE | 197 51 211 A1 | 5/1999 |
| DE | 100 26 048 C2 | 12/2001 |
| DE | 102 38 484 A1 | 3/2004 |
| DE | 103 41 045 A1 | 4/2005 |
| EP | 1 464 571 A2 | 10/2004 |
| WO | WO 99/20482 A1 | 4/1999 |

OTHER PUBLICATIONS

German Office Action dated Apr. 21, 2005 including English translations (Nine (9) pages).

* cited by examiner

DEVICE FOR GENERATING A HAPTIC SIGNAL IN A VEHICLE

CROSS-REFERENCE TO RELATED APPLICATIONS

This application is a continuation of PCT International Application No. PCT/EP2005/007142, filed on Jul. 1, 2005, which claims priority under 35 U.S.C. §119 to German Application No. 10 2004 033 487.0, filed Jul. 10, 2004, the entire disclosures of which are expressly incorporated by reference herein.

BACKGROUND AND SUMMARY OF THE INVENTION

The invention relates to a device for generating a haptic signal (in particular, a warning signal or informational signal) in a vehicle (in particular in a motorcycle), in which a driver's command may be given by way of a rotary gas handle, such as a motorcycle throttle grip.

The most varied devices are already known in which, as a function of predefined auxiliary conditions, a counter force is exerted on the gas pedal of a motor vehicle. DE 42 16 764 A1 describes a device which, by way of a servo device, compares the actual speed of the vehicle to a theoretical speed of the vehicle, where the theoretical speed of the vehicle has been generated as a function of a signal picked up by a weather sensor or a radio receiver. On reaching the theoretical speed generated, the pivotability of the gas pedal is limited by a pedal restoring force, which is generated by way of an actuator, is directed opposite to the direction of actuation, and is capable of being overriden by increased pedal pressure.

Furthermore, from DE 100 26 048 C2 a device for haptic signaling through a gas pedal is known in which, as a function of parameters relevant in driving, vibrations can be generated in the gas pedal. Therein, the vibration generator is completely integrated into the gas pedal and, on one side, is not supported on the body of the vehicle so that the vibrations generated by the gas pedal have no significant effects on the displacement of the gas pedal.

The objective of the invention is to specify an additional possible device for generating a haptic signal in a vehicle.

According to the invention, the objective is realized by a device for generating a haptic signal in a vehicle, in which the driver's command or the corresponding load requirement may be given by positioning of the rotary gas handle. Preferably, the device according to the invention is a component of a motorcycle. According to the invention, the device includes a device for determining at least one predefined operational condition for driving. The operational condition for driving to be determined, and monitored on an on-going basis, is related to the speed of the vehicle in the sense that, as a function of the detected operational condition for driving, the operational condition makes a change of the current speed of the vehicle advisable as a function of defined conditions. A theoretical speed of the vehicle (recommendation) can be generated or is calculated by stored algorithms. The defined conditions are such that, as a function of them, a change of the current speed appears reasonable and advisable with a view to driver safety, the operational safety of the vehicle, or in regard to legal regulations in the area of the stretch of road on which the vehicle is currently traveling.

According to a further aspect of the invention, a servo unit is formed in such a manner that, as a function of the at least one detected operational condition for driving, a theoretical speed of the vehicle can be generated and, based on the theoretical speed of the vehicle, a servo signal is generated, which represents the theoretical speed and is intended for actuation of a servo element of the vehicle. In connection with this, the servo element is formed such that the restoring force for the rotary gas handle, and/or the servo force acting on the rotary gas handle in a manner causing acceleration or deceleration, are/is adjustable.

Operational conditions for driving, in the sense of the invention, is meant to include all the operational parameters characterizing the operating state of the vehicle as well as all the parameters (information) from the environment of the vehicle which, considered together with the vehicle's speed, each have an effect on the safety of the driver, the operational safety of the vehicle, or the adherence to traffic regulations.

Operational parameters characterizing the operational state of the vehicle include, for example, the rotary speed of the engine, oil temperature, oil status, oil pressure, coolant temperature or motor temperature, reserve of fuel, but also the current state of inclination of the vehicle, (for example, the current angle of inclination of the wheel vis-à-vis the street surface in the case of a motorcycle) or whether the driving light is turned on, a brake has been actuated, a turn indicator has been turned on, and the like.

Operational conditions for driving in the environment of the vehicle include, for example, the radii of curves, distance to an object located ahead, (for example, an automobile driving ahead), indications of speed limits for the stretch of road on which the vehicle is currently traveling, states of the signal systems (such as traffic lights, a warning light at a railroad crossing without gates, a secured construction site, or the like), weather (for example, atmospheric humidity), slick ice, or the like.

The operational conditions for driving may be detected via suitable detection devices such as sensors, camera systems, or the like. However, it is also contemplated that some or all of the operational conditions for driving will be determined or transmitted via data stored in electronic systems (such as a navigation system, digital street maps, or the like). In particular, operational conditions for driving can also be determined via networked system components, such as other networked motor vehicles, or stationary network subscribers via satellite, radio, or the like. Also, in this way, the ends of traffic jams, locations of accidents, construction sites, or curves (radii) which lie ahead, can be determined.

Advantageously, the servo unit is formed in such a manner that a vehicle's theoretical speed, which is reduced in comparison to the actual speed of a vehicle, as well as a vehicle's theoretical speed which is increased in comparison to the actual speed of a vehicle, can be generated. A reduced theoretical speed is of interest in all the cases in which a situation critical to the driver and/or to the vehicle is to be expected if the speed is not reduced in accordance with the proposed theoretical speed. An increased theoretical speed can be of advantage in situations not critical to the driver and to the vehicle, e.g., if the driver in/on her/his vehicle is approaching a green light at an actual speed lying significantly below the permitted speed. In this way, the driver can be incited to accelerate, for example, by reducing the restoring force of the rotary gas handle.

An actual speed of the vehicle is also detected and, based on at least one operational condition for driving, a suitable theoretical speed for the vehicle is calculated as well as a servo signal corresponding to this theoretical speed for the vehicle for a specific transmission of torque to the rotary gas handle so that, thereby, a specific speed recommendation is given to the driver.

In a particularly preferred embodiment of the invention, the device according to the invention is a component of a motorcycle, where the servo unit and the device for detecting the operational condition(s) for driving are formed in such a manner that the radius of a curve on which the vehicle is presently traveling, or the radius of a curve lying directly ahead and on which the vehicle will travel, as well as the current angle of inclination of the motorcycle, are determined and, as a function thereof, a theoretical speed is generated and compared to the current actual speed. Depending on this comparison, the restoring force of a restoring device acting on the rotary gas handle is increased, or a braking force acting on the rotary gas handle and against the actuating force is generated. The servo unit is, preferably, formed in such a manner that the determination of the radius of the curve currently to be traveled is done with the use of a navigation system. The angle of inclination of the motorcycle can, for example, be determined via corresponding inclination sensors.

Preferably, the restoring device includes restoring springs integrated into the rotary gas handle or as gas throttle restoring springs in a carburetor or an injection device. In this connection, the restoring springs may be appropriately pre-loaded to a greater or lesser extent via a controllable electric motor. The introduction of the braking torque as an alternative to, or in addition to, increasing the restoring force, is preferably done via an electromagnet which is formed in such a manner that it exerts, directly or indirectly, a braking torque on the rotary gas handle (for example, by the rotor of the electromagnet being fastened on the rotary gas handle and the stator on the steering rod). Through the device according to the invention, the motorcycle driver receives information concerning a speed suitable for a curve on which the vehicle is presently traveling, or a curve lying directly ahead and on which the vehicle will travel. Through this type of speed recommendation for a curve, safety on unknown roads with many curves is clearly increased.

Other objects, advantages and novel features of the present invention will become apparent from the following detailed description of the invention when considered in conjunction with the accompanying drawings.

BRIEF DESCRIPTION OF THE DRAWING

In the following, the invention will be explained in more detail with the aid of a figure.

DETAILED DESCRIPTION OF THE DRAWING

Figure 1:
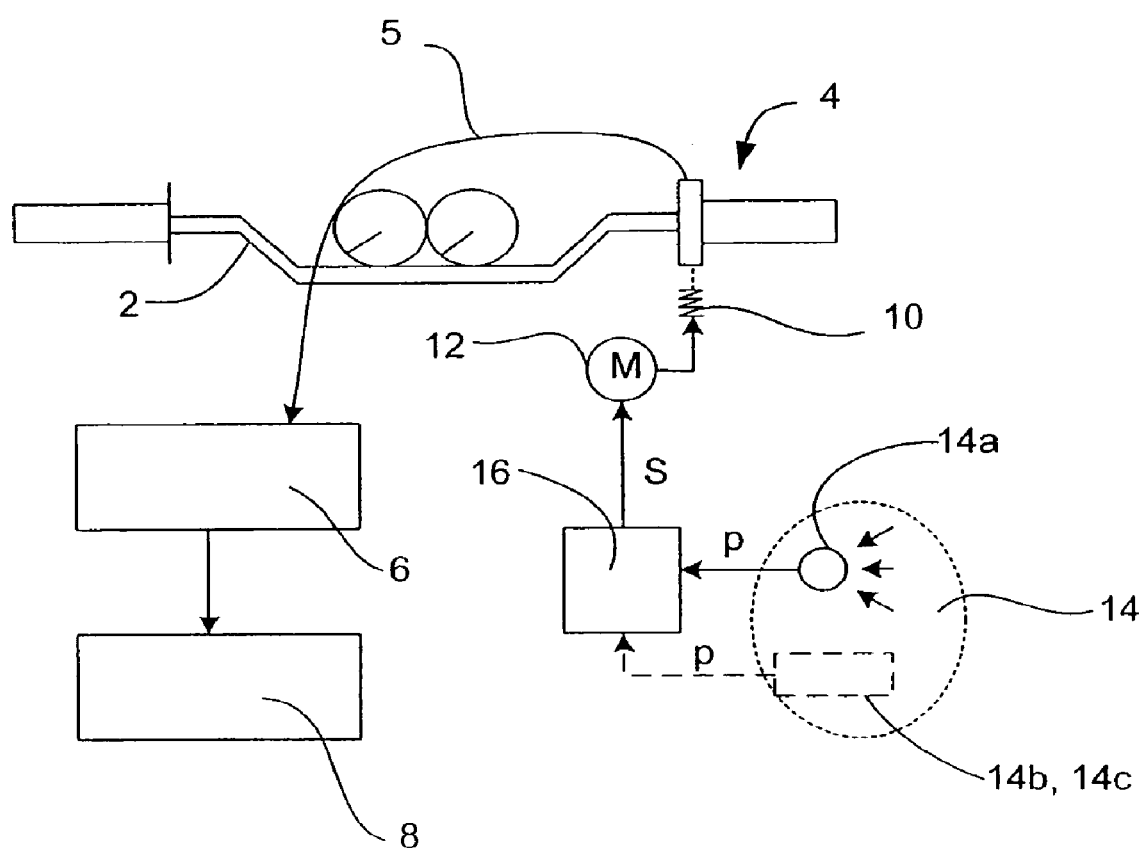
FIG. 1 shows in schematic representation the handle bars 2 of a motorcycle together with a mounted rotary gas handle.

Referring to the figure, for the purpose of transmitting the driver's command via a gas link, a rotary gas handle 4 is actively connected to a servo device 6 of the motor 8. The servo device is formed as a carburetor or injection device 5. Alternatively to the gas link 5, the transmission of the driver's command may also be done via a data line via which a potentiometer value adjustable by the rotary gas handle 4 (corresponding to the driver's command) is transmitted electronically. The grip of the rotary gas handle 4 is energized, via a restoring device 10, e.g., a restoring spring, with a restoring force through which it is automatically turned back into a starting position when the rotary gas handle 4 is not actuated.

According to another aspect of the invention, the device furthermore includes a servo element 12 actively connected to the restoring device 10. The servo element 12 in the present case is formed as a controllable electric motor through which the restoring spring 10 can be adjusted selectively in its pre-stressing. Furthermore, there are mechanisms 14 for determining at least one predefined operational condition for driving p. Determination of an operational condition for driving in the sense of the invention is understood to mean the detection of operating parameters of the vehicle itself, as well as the detection of state variables from the environment of the vehicle. In this connection, the detection may be done in the manner of measurement technology via a sensor apparatus 14a but detection may, however, also be done by calling stored data from a data storage device 14b or by querying data storage devices 14c which acquire their data from external sources via satellites, mobile telephones, or the like. Each determined or detected operational condition for driving is processed further by way of a servo unit 16. For this, the servo unit 16 calculates, as a function of the at least one detected operational condition for driving, a servo parameter proportional to a recommended theoretical speed. The servo motor 12 acting on the restoring spring 10 (pre-loading the restoring spring) is controlled by way of the calculated servo parameter. Thereby, the restoring spring 10, upon reaching the calculated theoretical speed, is pre-loaded to the extent that a torque sensible to the driver acts against its actuation force in the direction of the resting position of the rotary gas handle 4 and causes it to reduce its speed to correspond to the proposed theoretical speed. The increased restoring force or the generated braking servo force, each of which acts against a force in the direction of actuation for the purposes of acceleration, can be consciously overcome by the driver through an increased actuation force (ability to conform to the command from the driver).

The foregoing disclosure has been set forth merely to illustrate the invention and is not intended to be limiting. Since modifications of the disclosed embodiments incorporating the spirit and substance of the invention may occur to persons skilled in the art, the invention should he construed to include everything within the scope of the appended claims and equivalents thereof.

What is claimed is:

1. A device for generating a haptic signal in a vehicle, in which a driver's command is given via a rotary gas handle, comprising:

a restoring device for generating a restoring force acting on the rotary gas handle and a servo force generator for generating a servo force acting on the rotary gas handle in a direction of actuation inducing acceleration or deceleration;

means for detecting at least one predefined operational condition for driving, where the predefined operational condition for driving is one that makes a change of the current speed advisable as a function of definite conditions; and a servo unit operatively configured such that, as a function of the at least one detected predefined operational condition for driving, a theoretical speed for the vehicle is generated and, based on the theoretical speed for the vehicle, a servo signal for actuating a servo element is generated, wherein the servo element is operatively configured to adjust, based on the servo signal, at least one of the restoring force for the rotary gas handle and the servo force acting on the rotary gas handle.

2. The device according to claim 1, wherein the servo device is formed such that a theoretical speed of a vehicle reduced in comparison to the actual speed of a vehicle, as well as a theoretical speed of a vehicle increased in comparison to the actual speed of a vehicle, is generated.

3. The device according to claim 1, wherein the restoring device is formed as a restoring spring adjustable in its pre-loading; and the servo element is formed as an electric motor adjusting the pre-loading of the restoring springs.

4. The device according to claim 2, wherein the restoring device is formed as a restoring spring adjustable in its pre-loading; and the servo element is formed as an electric motor adjusting the pre-loading of the restoring springs.

5. The device according to claim 1, wherein the servo element is formed as an electromagnet transmitting a torque to the rotary gas handle.

6. The device according to claim 2, wherein the servo element is formed as an electromagnet transmitting a torque to the rotary gas handle.

7. A device for generating a haptic signal in a vehicle, in which a driver' command is given via a rotary gas handle, comprising:

at least one of a restoring device for generating a restoring force acting on the rotary gas handle and a servo force generator for generating a servo force acting on the rotary gas handle in a direction of actuation including acceleration or deceleration;

means for detecting at least one predefined operational condition for driving, where the predefined operational condition for driving is one that makes a change of the current speed advisable as a function of definite conditions; and a servo unit operatively configured such that, as a function of the at least one detected predefined operational condition for driving, a theoretical speed for the vehicle is generated and, based on the theoretical speed for the vehicle, a servo signal for actuating a servo element is generated, wherein the servo element is operatively configured to adjust, based on the servo signal, at least one of the restoring force for the rotary gas handle and the servo force acting on the rotary gas handle, wherein the servo element is forced as an electromagnet transmitting a torque to the rotary gas handle, and wherein a rotor of the electromagnet is integrated into or on a rotary grip part of the rotary gas handle, and a stator of the electromagnet is integrated into or on one of a steering rod and a fixed grip part of the rotary gas handle.

8. The device according to claim 1, wherein the means for determining at least one predefined operational condition for driving includes at least one of:

means for determining curve radii, means for determining vehicle inclination, means for determining legally permissible speed, means for detecting external air temperature, means for detecting weather conditions, means for acquiring information provided by networked vehicles and/or networked (vehicle control) systems, and means for electronic data processing with stored information of vehicle control systems.

9. The device according to claim 1, wherein the servo unit is formed such that the theoretical speed of the vehicle is determinable with aid of at least one of the following operational conditions for driving:

curve radius of the curve on which the vehicle is currently traveling, and angle of inclination of the vehicle to the street surface.

10. The device according to claim 2, wherein the servo unit is Formed such that the theoretical speed of the vehicle is determinable with aid of at least one of the following operational conditions for driving:

curve radius of the curve on which the vehicle is currently traveling, and angle of inclination of the vehicle to the street surface.

11. The device according to claim 9, wherein the servo unit is formed such that the determination of the curve radius of the curve on which the vehicle is currently traveling is done using a navigation system.

12. The device according to claim 10, wherein the servo unit is formed such that the determination of the curve radius of the curve on which the vehicle is currently traveling is done using a navigation system.

* * * * *